(12) United States Patent  (10) Patent No.: US 9,108,146 B1
Jackson  (45) Date of Patent: Aug. 18, 2015

(54) SYSTEM FOR REMOVING PARTICULATE MATTER FROM DIRTY AIR

(71) Applicant: Stephen Waco Jackson, Baton Rouge, LA (US)

(72) Inventor: Stephen Waco Jackson, Baton Rouge, LA (US)

(*) Notice: Subject to any disclaimer, the term of this patent is extended or adjusted under 35 U.S.C. 154(b) by 0 days.

(21) Appl. No.: 14/723,248

(22) Filed: May 27, 2015

Related U.S. Application Data

(60) Provisional application No. 62/006,745, filed on Jun. 2, 2014.

(51) Int. Cl.
| | |
|---|---|
| *B01D 53/14* | (2006.01) |
| *B01D 47/02* | (2006.01) |
| *B01D 46/00* | (2006.01) |
| *B01D 53/50* | (2006.01) |
| *B01D 53/56* | (2006.01) |
| *B01D 53/62* | (2006.01) |
| *B01D 53/78* | (2006.01) |
| *B01D 53/18* | (2006.01) |
| *B01D 53/34* | (2006.01) |

(52) U.S. Cl.
CPC ........ *B01D 53/1456* (2013.01); *B01D 46/0038* (2013.01); *B01D 53/18* (2013.01); *B01D 53/346* (2013.01); *B01D 53/50* (2013.01); *B01D 53/56* (2013.01); *B01D 53/62* (2013.01); *B01D 53/78* (2013.01); *B01D 2252/103* (2013.01); *B01D 2258/02* (2013.01); *B01D 2258/06* (2013.01)

(58) Field of Classification Search
CPC .. B01D 47/021; B01D 53/14; B01D 53/1425; B01D 53/1462; B01D 53/1468; B01D 53/1475; B01D 53/1481; B01D 53/1493; B01D 53/18; B01D 2101/02; B01D 21/0036; B01D 21/0042; B01D 21/0045; B01D 21/0048; B01D 46/0038; B01D 53/50; B01D 53/56; B01D 53/1456; B01D 53/62; B01D 53/78; B01D 2252/103; B01D 2258/02; B01D 2258/06

USPC ........... 96/234, 243, 236, 237, 240, 244, 267, 96/274, 269, 276, 278, 279, 280, 296, 297, 96/299, 300, 329, 333, 337, 351, 354, 355, 96/361

See application file for complete search history.

(56) References Cited

U.S. PATENT DOCUMENTS

| 4,624,791 | A  | * | 11/1986 | Ferriss ........................ 210/704 |
| 6,616,733 | B1 | * | 9/2003  | Pellegrin ....................... 95/150 |
| 2003/0056648 | A1 | * | 3/2003  | Fornai et al. ..................... 95/65 |
| 2011/0147194 | A1 | * | 6/2011  | Kamen et al. ............... 202/185.1 |
| 2014/0275693 | A1 | * | 9/2014  | Zink ............................. 585/833 |

* cited by examiner

*Primary Examiner* — Duane Smith
*Assistant Examiner* — Cabrena Holecek
(74) *Attorney, Agent, or Firm* — Buskop Law Group, P.C.; Wendy Buskop

(57) ABSTRACT

A system for removing particulate matter from dirty air and producing cleaned air without the need for heating, cooling, or pressurization. The system uses a bubble tank with grates, a centrifuge connected to the bubble tank with grates, and a pH neutralization container connected to the centrifuge. A pH tester and base bins contain pH adjusting bases that can communicate with a processor and data storage. The system compares the measured pH of the centrifuged water to a preset limit in a library and then determines the amount of base and type of base to be added to the centrifuged water to produce clean water.

10 Claims, 3 Drawing Sheets

SYSTEM FOR REMOVING PARTICULATE MATTER FROM DIRTY AIR

CROSS REFERENCE TO RELATED APPLICATION

The current application claims priority to and the benefit of U.S. Provisional Patent Application Ser. No. 62/006,745 filed on Jun. 2, 2014, entitled "SYSTEM FOR REMOVING PARTICULATE MATTER FROM DIRTY AIR." This reference is hereby incorporated in its entirety.

FIELD

The current embodiments generally relate to a system for removing particulate matter from dirty air.

BACKGROUND

A need exists for an easy to use low pressure system for cleaning dirty air that can be placed atop buildings or at ground level.

The present embodiments meet these needs.

BRIEF DESCRIPTION OF THE DRAWINGS

The detailed description will be better understood in conjunction with the accompanying drawings as follows.

Figure 1:
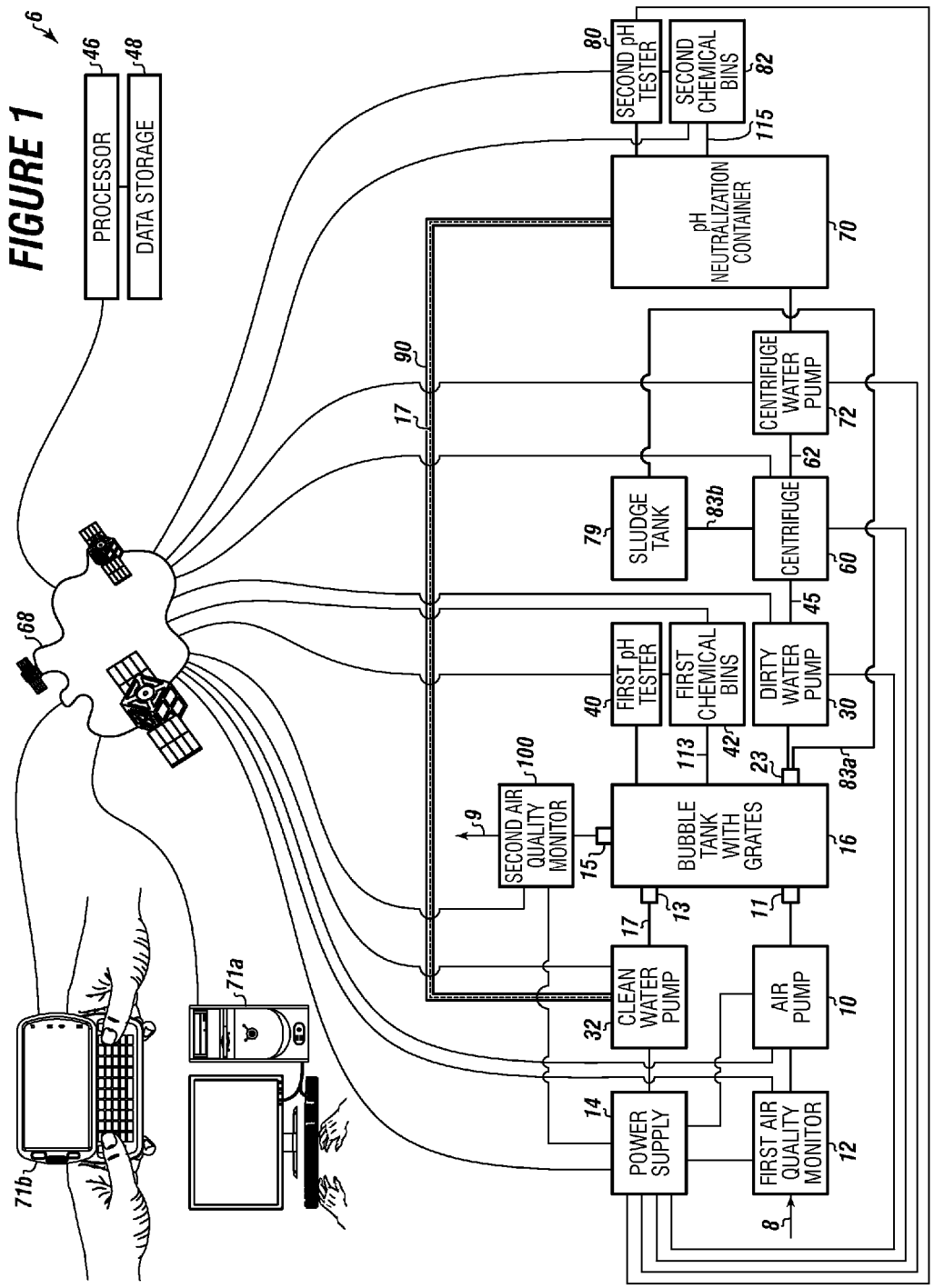
FIG. 1 depicts a diagram of the components of a system connected together in sequences according to one or more embodiments.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The current embodiments generally relate to a system for removing particulate matter from dirty air.

The system can remove from dirty air (i) particulate matter and (ii) at least one of:

carbon dioxide, carbon monoxide, sulfur dioxide, and nitrogen oxides and can produce clean air without the need for heating, cooling, or pressurization.

The system can use dirty air input using an air pump to pass dirty air through a first air quality monitor to a bubble tank with grates containing water.

The bubble tank with grates can be configured to cause a chemical reaction of at least one of the following: (i) carbon dioxide in the dirty air to basely react with the unpressurized clean pH neutral water and a selected base forming a carbonic acid; (ii) sulfur dioxide in the dirty air to combine with the unpressurized clean pH neutral water and a selected base to form sulfuric acid; (iii) carbon monoxide in the dirty air to combine with the unpressurized clean pH neutral water and a selected base to form carbolic acid; and (iv) nitrogen oxides in the dirty air to combine with the unpressurized clean pH neutral water and a selected base to form nitric acid.

The bubble tank with grates can have a first pH tester connected to first chemical bins containing bases to monitor pH and can use stored information on base reactors to provide bases from the first chemical bins into the bubble tank with grates and neutralize the water.

The first pH tester can be in communication with a processor with a data storage via a network. In embodiments, the processor can cause the amount and type of bases to be inserted into the bubble tank with grates using computer instructions in the data storage connected to the processor.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

In embodiments, the data storage can contain a library of preset pH limits for the dirty water.

The term "activated carbon filter" as used herein can refer to a filter made from charcoal that can be disposed to remove particulate matter from the bubbles of dirty air after passing through the second holes of the second grate and simultaneously to remove odor from the bubbles of dirty air. In embodiments, the activated carbon filter can be a planar filter that can extend to touch each of the inside walls of the bubble tank with grates. In additional embodiments, the activated carbon filter can have a thickness from 1 inch to 6 inches.

The term "air pump" as used herein can refer to an air pump that operates on AC current and moves dirty air into the system at a psi from 1 psi to 250 psi. In embodiments, the air pump can operate on DC current.

The term "bubble tank with grates" as used herein can refer to a tank that can be from 1 gallon to 10,000 gallons, and can be larger if sufficient support exists under the bubble tank.

The term "centrifuge" as used herein can refer to a device for separating particulate matter from the dirty water pumped from the bubble tank with grates using centrifugal force. In embodiments, the centrifuge can spin the water up to 900 times the force of gravity, achieving flow rates up to 20 gallons per minute and pushing the particulate matter to the side walls of the centrifuge for removal manually by scooping out of the centrifuge.

The phrase "base bins containing pH adjusting bases" as used herein can refer to containers attached to the pH neutralization container that contain at least one acid and at least one base, such as sulfuric acid for the acid, and ammonia for the base.

The term "cleaned air" as used herein can refer to atmospheric air having a particulate matter content, such as air ranging from 50 ppm to 200 ppm.

The term "clean water" as used herein can refer to water with a particulate matter content ranging from 50 ppm to 300 ppm.

The term "clean water pump" as used herein can refer to a water pump that can operate to flow clean water into the bubble tank with grates at a rate of 20 gallons to 70 gallons per minute.

The term "dirty air" as used herein can refer to atmospheric air having a particulate matter content ranging from 201 ppm to 400 ppm. In embodiments, the system can be located atop a building to treat polluted air and/or dirty air around the building. At large manufacturing facilities, the dirty air can be air within the plant or from manufacturing processes of the manufacturing facility.

The term "dirty water pump" as used herein can refer to a pump that can flow dirty water from the bubble tank with grates to a centrifuge that can operates on power from the power supply and can flow the water at a rate from 20 gallons to 70 gallons per minute.

The term "first grate" as used herein can refer to a plate with first holes to break up bubbles of dirty air pumped into the bubble tank with grates. The first grate can be a planar piece of plastic or steel that can extend to touch each of the inside walls of the bubble tank with grates. The first holes of the first grate can have a first diameter. The first grate can have from 100 holes to 5,000 holes. The diameter for the first holes can range from ⅛ of an inch to 1 inch. The first grate can be positioned in the bubble tank with grates immediately above the dirty air inlet, such as from 1 inch to 4 inches above the dirty air inlet of the bubble tank with grates. In embodiments, the first grate can have a thickness from ⅛ of an inch to 1 inch.

The term "high efficiency particulate air filter" as used herein can refer to a HEPA filter. The HEPA filter receives air from the activated charcoal filter and by using multiple layers of cellulose. The HEPA filter can then capture additional particulate matter that escaped the activated charcoal filter. The HEPA filter forms cleaned air for exit through the cleaned air outlet of the bubble tank with grates.

The term "particulate matter" as used herein can refer to at least one of: dust, dirt, pollen, soot, or a particle having a diameter from 2.5 microns to 10 microns.

The term "pH neutralization container" as used herein can refer to a tank for receiving the centrifuged water from the centrifuge. The pH neutralization container can be the same size as the bubble tank with grates and can be made from identical materials. The pH neutralization container can have an inlet from the centrifuged water and a clean water outlet as well as ports for allowing pH testing of the water in the pH neutralization container and enable pH level adjustment based on the testing using base contained in bins fluidly connected to the bubble tank with grates. The pH neutralization container allows adjustment of the pH of the centrifuge water to 7 pH +/−0.2.

The term "pH Tester" as used herein can refer to a water pH tester, such as a water pH tester made by HANNA INSTRUMENTS™ of Rhode Island.

The term "power supply" as used herein can refer to a portable power supply, such as batteries or solar charged batteries. In embodiments, the portable power supply can include generators. In embodiments, the power supply can be configurable between the two types of power, such as AC and/or DC. In embodiments, the power supply can be a power grid, that is, the system components can plug into an electrical outlet of a building or location to receive power from the power grid.

The term "second grate" as used herein can refer to a plate with second holes to break up bubbles of dirty air pumped into the bubble tank with grates. The second grate can be a planar piece of plastic or steel that can extend to touch each of the inside walls of the bubble tank with grates. The second grate can have from 100 holes to 5,000 holes. In embodiments, the second grate can have a thickness from ⅛ of an inch to 1 inch.

The term "sludge tank" as used herein can refer to a tank fluidly connected to the centrifuge for periodically receiving particulate matter from the centrifuge.

The term "soot" as used herein can refer to particles that result from the imperfect burning of hydrocarbons, such as coal, diesel fuel, or particles that result from forest fires, volcanos, or particles that result from other burning material including: gas, grass, or plastics.

The term "third grate" as used herein can refer to a plate or planar object containing third holes. The third grate can be positioned in the bubble tank with grates to receive air from the activated carbon filter and further break up the air. The third grate can be a planar piece of plastic or steel that can extend across the bubble tank with grates to touch each of the inside walls of the bubble tank with grates. The third holes of the third grate can have the same diameter as the second grate. The third grate can have from 100 holes to 5,000 holes. In embodiments, the third grate can have a thickness from ⅛ of an inch to 1 inch.

The term "unpressurized clean pH neutral water" can refer to water that has not been pressurized by a device, is at atmospheric pressure, and has a pH of 7+/−0.2.

The bubble tank with grates can be formed from steel, polymer, or a non-collapsing material that can be capable of holding the required amount of water without deforming.

In embodiments, the bubble tank with grates can have a 250 gallon capacity and can be cylindrical with a diameter of 36 inches and a height of 60 inches. The bubble tank with grates can have a lid that can be removable.

In embodiments, the bubble tank with grates can be clear plastic created from a single injection molded form providing an integral safe shape.

The bubble tank with grates can have at least three grates contained within the bubble tank with grates.

In embodiments, from 10 grates to 20 grates can be used. The bubble tank with grates can be formed with the air inlet penetrating a wall of the bubble tank with grates.

In embodiments, the air inlet can have a diameter from 1 inch to 5 inches for allowing dirty air to flow into the bubble tank with grates. The air inlet in the bubble tank with grates can be located at a point beneath all the grates used in the bubble tank with grates, allowing the dirty air to rise upward through the grates in the bubble tank with grates.

The bubble tank with grates can have a clean water inlet that allows clean water to pass from outside the bubble tank with grates to inside the bubble tank with grates. The clean water inlet can be positioned anywhere in the wall of the bubble tank with grates. The clean water inlet can have a diameter from 1 inch to 6 inches.

The bubble tank with grates can have a cleaned air outlet formed through a wall of the bubble tank with grates near a top of the bubble tank with grates or in the top of the bubble tank with grates.

The bubble tank with grates can have a dirty water outlet formed through the wall of the bubble tank with grates near the bottom of the bubble tank with grates or formed in the bottom of the bubble tank with grates if the bubble tank with grates is elevated on a stand. In embodiments, the dirty water outlet can be located beneath all the grates and can be used for flowing dirty water from the bubble tank with grates to the centrifuge using a water pump.

In embodiments, the bubble tank with grates can be cylindrical, cubical, rectangular, or any other suitable shape depending upon application.

In embodiments, the bubble tank with grates can have as the first grate, the second grate or both the first and second grates, a triangular grate with holes that can be 35 inches from the base to the top with cross members welded to provide support.

In embodiments, 7 round grates can be used each with 3/16 inch diameter perforations. Each round grate can be 35.5 inches in diameter.

The inlets and outlets can be formed from 4 inch diameter PVC pipe.

In embodiment, the bubble tank with grates can sit on ground level. A 4 inch PVC pipe can run from the air pump to about 6 inches from the top the bubble tank with grates where it is connected to a 90 degree PVC elbow and a 4 inch PVC downpipe. The down pipe can be connected to a 4 inch PVC rectangular closed loop with many holes drilled in it to diffuse the dirty air coming in from the air pump. A 4 inch PVC pipe approximately 12 inches long can be filled with steel scrap and sealed at both ends and banded to the diffuser to weight it down. The grate assembly can be lowered into the bubble tank with grates.

In embodiments, the air intake can be from 5 inches to 20 inches to the top of the bubble tank with grates to prevent backwash when the air pump is turned off. The air pump can be elevated and go directly into the intake or the air pump can sit at ground level and the pipe can be run up the outside from the air pump and down into the bubble tank with grates.

The air pump can be a 50 Hz side channel blower capable of generating 80 inches of water gauge static air pressure. In embodiments, European models of air pumps can be used having 50 Hz and an inverter to convert the power to a US standard 60 Hz.

The centrifuge can allow for automatic particulate removal through a hole in the bottom of the centrifuge. The centrifuge can allow fluid to flow out of the centrifuge producing centrifuged water which can be "acid water". Usable centrifuges can be those from PRAB™ of Kalamazoo, Mich. The centrifuge can be connected to the power supply of the system.

Turning now to the Figures, FIG. 1 depicts a diagram of the components of a system connected together in sequences according to one or more embodiments.

The system 6 can simultaneously remove from dirty air, particulate matter, and remove at least one of: carbon dioxide, carbon monoxide, sulfur dioxide, nitric oxide and nitrous oxide, producing cleaned air without the need for heating and cooling of the dirty air.

The system 6 can receive dirty air 8 at 1 bar or less through a first air quality monitor 12.

The dirty air is pulled into the system 6 using an air pump 10 which can be powered by a power supply 14 in communication with a processor 46 via a network 68. The air pump 10 can be in communication with the processor 46 via the network 68. In embodiments, the power supply 14 can be in communication with the network 68.

The air pump 10 can blow the dirty air 8 into a bubble tank with grates 16 through an air inlet 11.

In embodiments, the air pump 10 can be elevated above the water line of the bubble tank with grates 16.

In additional embodiments, the air pump 10 can pump dirty air 8 into an up pipe and then a down pipe into the bubble tank with grates 16, transferring the dirty air 8 to a lower portion of the bubble tank with grates 16. Both of these embodiments avoid backwash when the air pump 10 is turned off.

The first air quality monitor 12 can be connected to the power supply 14 and the network 68.

The power supply 14 can be a generator, onboard batteries, a solar charged battery assembly, or even a fuel cell system.

The power supply 14 can be sufficient to drive the monitors, pumps, chemical bins, and a processor and connect to a network when needed.

In embodiments, a first air quality monitor 12 can measure pollutants and particulate matter in the dirty air 8.

In embodiments, the first air quality monitor 12 and the air pump 10 can communicate with the network 68.

A clean water pump 32 can be connected to the power supply 14.

The clean water pump 32 can flow clean water 17 produced by the system 6 back into the bubble tank with grates 16.

In embodiments, the clean water pump 32 can flow clean water 17 from another clean water source or reservoir into the bubble tank with grates 16 through a clean water inlet 13 in the bubble tank with grates 16.

In embodiments, the clean water 17 can be unpressurized and pH neutral.

The bubble tank with grates 16 can treat the dirty air 8 and produce cleaned air 9 which can be removed from the bubble tank with grates through a cleaned air outlet 15.

The cleaned air 9 can pass through a second air quality monitor 100. In embodiments, the second air quality monitor 100 can be in the air flow passageway of the cleaned air outlet 15.

The second air quality monitor 100 can be in electrical connection with the power supply 14 and in electronic communication with the network 68.

In embodiments, a first pH tester 40 can be electrically connected to the power supply 14 and can be fluidly connected to the bubble tank with grates 16 and simultaneously in electronic communication with first chemical bins 42 and the processor 46 via the network 68.

The first chemical bins 42 can be in fluid communication with the bubble tank with grates 16 and in electronic communication with the network 68.

As the dirty air 8 rises in the bubble tank with grates 16, the water in the bubble tank with grates 16 becomes acidic.

The first chemical bins 42 dispense first bases 113 that reduce acidity in the now dirty water in the bubble tank with grates 16 to a neutral pH, such as 7.

As the bubbles in the dirty air rise in the bubble tank with grates 16, chemicals in the dirty air combine with both the hydrogen and oxygen of the water molecules and the water then becomes acidic.

The bubble tank with grates 16 can be configured to cause at least one of the following chemical reactions: formation of carbonic acid by combining carbon dioxide in the dirty air with water in the bubble tank with grates 16; formation of sulfuric acid by combining sulfur dioxide in the dirty air with water in the bubble tank with grates 16; formation of carbolic acid by combining carbon monoxide in the dirty air with water in the bubble tank with grates 16; and formation of nitrogen oxide in the bubble tank with grates 16.

The first pH tester 40 and the first chemical bins 42 can each be in electronic communication with the network 68.

The network 68 can further communicate to the processor 46 with a data storage 48.

The processor 46 can be a computer, such as a lap top or a plurality of connected processors, such as cloud based processors.

The network 68 can be the internet or another network, such as a cellular network, a satellite network, another global communication network, a wide area network, a local area network, or a combination of any of these listed networks.

The network 68 and the processor 46 can also communicate with client devices 71a and 71b.

The client devices 71a and 71b can be used to monitor any pH tester, air quality monitor, chemical bins, pump or another electronically controllable device used in the system 6.

The client devices 71a and 71b can be smart phones, tablet computers, or other types of computers. The client devices 71a and 71b can have processors with data storages, displays, and an ability to provide bidirectional messaging using a connection to the network 68.

The bubble tank with grates 16 can have an outlet which can flow particles 83a to a sludge tank 79.

The bubble tank with grates 16 can have a dirty water outlet 23 for flowing dirty water 45 from the bubble tank with grates 16.

It should be noted that the bubble tank with grates 16 can cause chemical reactions to occur with the dirty air 8.

It should be noted that the processor 46 can perform comparative analysis using the first air quality monitor 12 and the second air quality monitor 100 and the first pH tester 40 in view of preset limits for contaminates.

The type and amount of bases in the chemical bins to be dispensed into the bubble tank with grates 16 will be computed by the processor 46 using information from the first air quality monitor 12, the second air quality monitor 100, and the first pH tester 40.

In embodiments, the processor 46 can use information from a database of chemical reactions for neutralizing the acidity of the water given detected contaminants in parts per million in the dirty air being bubbled through the water.

A dirty water pump 30 can be electrically connected to the power supply 14 and electronically connected to the network 68 and the processor 46.

The dirty water pump 30 can flow dirty water 45 from the dirty water outlet 23 to a centrifuge 60 on command by the processor 46.

The centrifuge 60 can be electrically connected to the power supply 14 as well as electronically connected to the network 68 and in electronic communication with the processor 46.

The centrifuge 60 can be fluidly connected to the sludge tank 79 for receiving particulate matter 83*b* from the centrifuge 60 after the centrifuge 60 treats the dirty water 45.

The centrifuge 60 can produce centrifuged water 62.

A centrifuge water pump 72 can pump the centrifuged water 62 to a pH neutralization container 70.

The centrifuge water pump 72 can be electrically connected to the power supply 14 and electronically connected to the network 68 and the processor 46.

A second pH tester 80 can be fluidly connected to the pH neutralization container 70 to test water in the pH neutralization container 70. The second pH tester 80 can be electronically connected to the network 68 and the processor 46.

The second pH tester 80 can be connected to second chemical bins 82 that contain second bases 115.

The second chemical bins 82 can contain second bases 115 that when added to the pH neutralization container 70 enable the pH neutralization container to produce clean water 17 with a pH of about 7.

The clean water 17 can be recycled through a conduit 90 back to the clean water pump 32 for use in the system 6.

Figure 2:
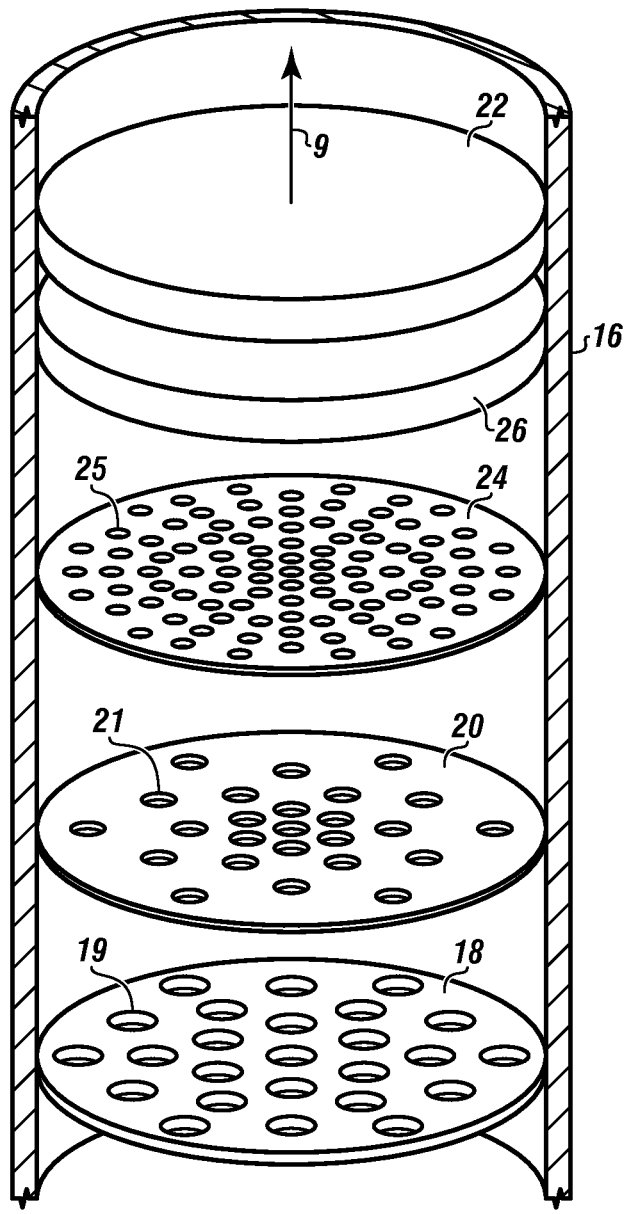
FIG. 2 depicts a cut away view of the inside of a portion of a bubble tank with grates according to one or more embodiments.

FIG. 2 depicts a cut away view of the inside of a portion of the bubble tank with grates according to one or more embodiments.

The bubble tank with grates 16 can include a first grate 18 having first holes 19 to break up bubbles of dirty air pumped into the bubble tank with grates 16 by the air pump.

The bubble tank with grates 16 can include a second grate 20 with second holes 21 to break up bubbles of dirty air from dirty air that has passed through the first holes 19 of the first grate 18.

In embodiments, the bubble tank with grates 16 can include with a third grate 24 with third holes 25 positioned in the bubble tank with grates 16 to receive dirty air bubbles from the second grate 20 with second holes 21.

In embodiments, a high efficiency particulate air filter 26, known as a "HEPA" filter 26, can be positioned in the bubble tank with grates 16 to receive air from grates with holes and remove particulates.

In embodiments, the bubble tank with grates 16 can include an activated carbon filter 22 adjacent the HEPA filter to simultaneously (i) remove particulate matter from the bubbles of dirty air and (ii) remove odor from the bubbles of dirty air.

Cleaned air 9 is shown leaving the activated carbon filter 22.

Figure 3:
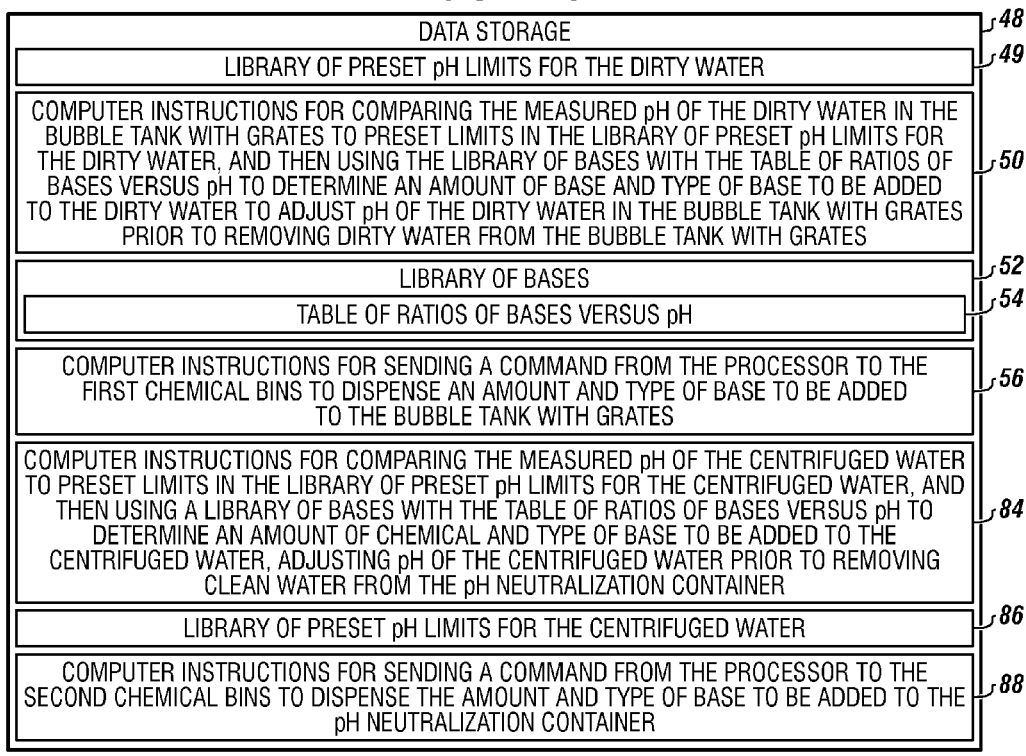
FIG. 3 depicts a data storage used to automate processes of the system according to one or more embodiments.

FIG. 3 depicts a data storage used to automate processes of the system according to one or more embodiments.

The processor of the system can communicate using computer instructions and information in the data storage 48 via the network. The data storage 48 can include computer instructions to instruct the processor to perform various tasks.

The data storage 48 can include a library of preset pH limits for the dirty water 49.

The data storage 48 can include a library of bases 52 and a table of ratios of bases versus pH 54.

The data storage can include computer instructions 50 for comparing a measured pH of the dirty water in the bubble tank with grates to preset limits in the library of preset pH limits for the dirty water, and then using the library of bases with the table of ratios of bases versus pH to determine an amount of base and type of base to be added to the dirty water to adjust pH of the dirty water in the bubble tank with grates prior to removing dirty water from the bubble tank with grates.

The data storage can include computer instructions 56 for sending a command from the processor to the first chemical bins to dispense an amount and type of base to be added to the bubble tank with grates.

The data storage 48 can include a library of preset pH limits for the centrifuged water 86.

The data storage can include computer instructions 84 for comparing the measured pH of the centrifuged water to preset limits in the library of preset pH limits for the centrifuged water, and then using the library of bases with the table of ratios of bases versus pH to determine an amount chemical and type of base to be added to the centrifuged water, adjusting pH of the centrifuged water prior to removing clean water from the pH neutralization container.

The data storage can include computer instructions 88 for sending a command from the processor to the second chemical bins to dispense the amount and type of base to be added to the pH neutralization container.

Examples of cleaning of dirty air by the system are as follows and are merely illustrative of how the system can be used.

Example 1 involved a 100 gallon capacity bubble tank with grates which is 64 inches tall and 23 inches in diameter and 80 gallons of tap water were installed.

The depth of water in the bubble tank with grates was 51 inches. When the water in the bubble tank with grates was saturated by dirty air the pH factor was −5.5. 0.35 ounces of a sodium hydroxide base was flowed into the water to neutralize the pH factor. After neutralization, the pH factor was from 6.8 pH to 7.2 pH.

The air pump used had a static air pressure measured at 61 inches. The air pump was positioned at the ground level. The air flow at the air inlet was measured at 194 cubic feet per minute. Loss of air flow for the volume in the pipes was 0.54 cubic feet. The air flow at output was 193.46 cubic feet per minute.

An up pipe having a 4 inch inner diameter was used to flow air into the bubble tank with grates. A down pipe was connected to the up pipe and extended into the bubble tank with grates. The down pipe had a diameter of 4 inches. The length of the up pipe was 54 inches. The length of the down pipe was 56 inches.

The volume of air lost in the up pipe was 462.24 cubic inches. The volume of air lost in the down pipe was 479.36 cubic inches. The total volume of air lost in the pipes was 941.60 cubic inches. The total volume of air in the pipes was 0.54 cubic feet.

Dirty air coming into the bubble tank with grates had 139 ppm of 2.5 micron particulate.

Dirty air coming into the bubble tank with grates had 273 ppm of 10 micron particulate.

Clean air expelling from the bubble tank with grates had 10 ppm of 2.5 micron particulate.

Clean air expelling from the bubble tank with grates had 123 ppm of 10 micron particulate.

The National Ambient Air quality standards for clean air according to 40 CFR part 50 final rule date of Oct. 15, 2006 states: for air 2.5 micron particulate should be 12 ppm or less and for air with 10 micron particulate should be 150 ppm.

Example 2 included a 200 gallon capacity bubble tank with grates which was 60 inches tall and 30 inches in diameter and 160 gallons of tap water were installed.

The depth of water in the bubble tank with grates was 48 inches. When the water in bubble tank with grates was saturated by dirty air the pH factor was −5.5 pH. 0.45 ounces of a potassium hydroxide base was flowed into the water to neutralize the pH factor. After neutralization, the pH factor was from 6.8 pH to 7.2 pH.

The air pump used had a static air pressure measured at 58 inches. The air pump was positioned at an elevated level. For air flow, air flow at the air intake was measured at 181.88 cubic feet per minute. Loss of air flow for the volume in the pipes was 0.26 cubic feet. The air flow at output was 181.62 cubic feet per minute.

A down pipe having a 4 inch inner diameter was used to flow air into the bubble tank with grates. A down pipe was connected to the up pipe and extended into the bubble tank with grates. The down pipe had a diameter of 4 inches. The length of the down pipe was 52 inches.

The volume of air lost in the down pipe was 445.12 cubic inches. The total volume of air lost in the pipes was 941.60 cubic inches. The total volume of air in the pipes in cubic feet was 0.26 cubic feet.

Dirty air coming into the bubble tank with grates had 139 ppm of 2.5 micron particulate.

Dirty air coming into the bubble tank with grates had 273 ppm of 10 micron particulate.

Clean air expelling from the bubble tank with grates had 10 ppm of 2.5 micron particulate.

Clean air expelling from the bubble tank with grates had 120 ppm of 10 micron particulate.

The National Ambient Air quality standards for clean air according to 40 CFR part 50 final rule date of Oct. 15, 2006 states: for air 12 micron particulate should be 12 ppm or less and for air with 10 micron particulate should be 150 ppm.

Example 3 included a 300 gallon capacity bubble tank with grates which was 79 inches tall and 35 inches in diameter and 240 gallons of tap water were installed.

The depth of water in the bubble tank with grates was 63 inches. When the water in the bubble tank with grates was saturated by dirty water the pH factor was −5.5. 0.6 ounces of a sodium hydroxide base was flowed into the water to neutralize the pH factor. After neutralization, the pH factor was from 6.8 pH to 7.2 pH.

The air pump used had a static air pressure measured at 76 inches. The air pump was positioned at ground level. For air flow, air flow at the air intake was 239.47 cubic feet per minute. Loss of air flow for the volume in the pipes was 0.69 cubic feet. The air flow at output was 238.78 cubic feet per minute.

An up pipe having a 4 inch inner diameter was used to flow air into the bubble tank with grates. A down pipe was connected to the up pipe and extended into the bubble tank with grates. The down pipe had a diameter of 4 inches. The length of the up pipe was 69 inches. The length of the down pipe was 71 inches.

The volume of air lost in the up pipe was 590.64 cubic inches. The volume of air lost in the down pipe was 607.76 cubic inches. The total volume of air lost in the pipes was 1,198.4 cubic inches. The total volume of air in the pipes in cubic feet was 0.69 cubic feet.

Dirty air coming into the bubble tank with grates had 139 ppm of 2.5 micron particulate.

Dirty air coming into the bubble tank with grates had 273 ppm of 10 micron particulate.

Clean air expelling from the bubble tank with grates had 10 ppm of 2.5 micron particulate.

Clean air expelling from the bubble tank with grates had 117 ppm of 10 micron particulate.

The National Ambient Air quality standards for clean air according to 40 CFR part 50 final rule date of Oct. 15, 2006 states: for air 2.5 micron particulate should be 12 ppm or less and for air with 10 micron particulate should be 150 ppm.

Example 4 included a 400 gallon capacity bubble tank with grates which was 72 inches tall and 43 inches in diameter and 320 gallons of tap water were installed.

The depth of water in the bubble tank with grates was 58 inches. When the water in bubble tank with grates was saturated by dirty air the pH factor was −5.5 pH. 0.75 ounces of a potassium hydroxide base was flowed into the water to neutralize the pH factor. After neutralization, the pH factor was from 6.8 pH to 7.2 pH.

The air pump used had a static air pressure measured at 69 inches. The air pump was positioned at an elevated level. For air flow, air flow at the air intake as measured in cubic feet per minute was 218.25. Loss of air flow for the volume in the pipes was 0.32 cubic feet. The air flow at output was 217.93 cubic feet per minute.

A down pipe having a 4 inch inner diameter was used to flow air into the bubble tank with grates. A down pipe was connected to the up pipe and extended into the bubble tank with grates. The down pipe had a diameter of 4 inches. The length of the down pipe was 64 inches.

The volume of air lost in the down pipe was 547.84 cubic inches. The total volume of air lost in the pipes was 941.60 cubic inches. The total volume of air in the pipes in cubic feet was 0.32 cubic feet.

Dirty air coming into the bubble tank with grates had 139 ppm of 2.5 micron particulate.

Dirty air coming into the bubble tank with grates had 273 ppm of 10 micron particulate.

Clean air expelling from the bubble tank with grates had 10 ppm of 2.5 micron particulate.

Clean air expelling from the bubble tank with grates had 120 ppm of 10 micron particulate.

The National Ambient Air quality standards for clean air according to 40 CFR part 50 final rule date of Oct. 15, 2006 states: for air 12 micron particulate should be 12 ppm or less and for air with 10 micron particulate should be 150 ppm.

Example 5 included a 500 gallon capacity bubble tank with grates which was 76 inches tall and 46 inches in diameter and 400 gallons of tap water were installed.

The depth of water in the bubble tank with grates was 61 inches. When the water in the bubble tank with grates was saturated by dirty air the pH factor was −5.5. 0.75 ounces of a sodium hydroxide base was flowed into the water to neutralize the pH factor. After neutralization, the pH factor was from 6.8 pH to 7.2 pH.

The air pump used had a static air pressure measured at 73 inches. The air pump was positioned at ground level. For air flow, air flow at the air intake as measured in cubic feet per minute was 230.38. Loss of air flow for the volume in the pipes was 0.66 cubic feet. The air flow at output was 229.71 cubic feet per minute.

An up pipe having a 4 inch inner diameter was used to flow air into the bubble tank with grates. A down pipe was connected to the up pipe and extended into the bubble tank with grates. The down pipe had a diameter of 4 inches. The length of the up pipe was 66 inches. The length of the down pipe was 68 inches.

The volume of air lost in the up pipe was 564.96 cubic inches. The volume of air lost in the down pipe was 582.08 cubic inches. The total volume of air lost in the pipes was 1,147.04 cubic inches. The total volume of air in the pipes in cubic feet was 0.66 cubic feet.

Dirty air coming into the bubble tank with grates had 139 ppm of 2.5 micron particulate.

Dirty air coming into the bubble tank with grates had 273 ppm of 10 micron particulate.

Clean air expelling from the bubble tank with grates had 10 ppm of 2.5 micron particulate.

Clean air expelling from the bubble tank with grates had 117 ppm of 12 micron particulate.

The National Ambient Air quality standards for clean air according to 40 CFR part 50 final rule date of Oct. 15, 2006 states: for air 2.5 micron particulate should be 12 ppm or less and for air with 10 micron particulate should be 150 ppm.

Example 6 included a 600 gallon capacity bubble tank with grates which was 75 inches tall and 52 inches in diameter and 480 gallons of tap water were installed.

The depth of water in the bubble tank with grates was 60 inches. When the water in the bubble tank with grates was saturated by dirty air the pH factor was −5.5 pH. 0.9 ounces of a potassium hydroxide base was flowed into the water to neutralize the pH factor. After neutralization, the pH factor was from 6.8 pH to 7.2 pH.

The air pump used had a static air pressure measured at 72 inches. The air pump was positioned at an elevated level. For air flow, air flow at the air intake as measured at 227.34 cubic feet per minute. Loss of air flow for the volume in the pipes was 0.33 cubic feet. The air flow at output was 227.01 cubic feet per minute.

A down pipe having a 4 inch inner diameter was used to flow air into the bubble tank with grates. A down pipe was connected to the up pipe and extended into the bubble tank with grates. The down pipe had a diameter of 4 inches. The length of the down pipe was 67 inches.

The volume of air lost in the down pipe was 573.52 cubic inches. The total volume of air in the pipes in cubic feet was 0.33 cubic feet.

Dirty air coming into the bubble tank with grates had 139 ppm of 2.5 micron particulate.

Dirty air coming into the bubble tank with grates had 273 ppm of 10 micron particulate.

Clean air expelling from the bubble tank with grates had 10 ppm of 2.5 micron particulate.

Clean air expelling from the bubble tank with grates had 120 ppm of 10 micron particulate.

The National Ambient Air quality standards for clean air according to 40 CFR part 50 final rule date of Oct. 15, 2006 states: for air 12 micron particulate should be 12 ppm or less and for air with 10 micron particulate should be 150 ppm.

Example 7 included a 1,000 gallon capacity bubble tank with grates which was 80 inches tall and 64 inches in diameter and 800 gallons of tap water were installed.

The depth of water in the bubble tank with grates was 64 inches. When the water in bubble tank with grates was saturated by dirty air the pH factor was −5.5 pH. 3.5 ounces of a sodium hydroxide base was flowed into the water to neutralize the pH factor. After neutralization, the pH factor was from 6.8 pH to 7.2 pH.

The air pump used had a static air pressure measured at 77 inches. The air pump was positioned at the ground level. For air flow, air flow at the air intake as measured was 242.5 cubic feet per minute. Loss of air flow for the volume in the pipes was 2.81 cubic feet. The air flow at output was 239.69 cubic feet per minute.

An up pipe having an 8 inch inner diameter was used to flow air into the bubble tank with grates. A down pipe was connected to the up pipe and extended into the bubble tank with grates. The down pipe had a diameter of 8 inches. The length of the up pipe was 70 inches. The length of the down pipe was 72 inches.

The volume of air lost in the up pipe was 2,396.8 cubic inches. The volume of air lost in the down pipe was 2,465.28 cubic inches. The total volume of air lost in the pipes was 4,862.08 cubic inches. The total volume of air in the pipes in cubic feet was 2.81 cubic feet.

Dirty air coming into the bubble tank with grates had 139 ppm of 2.5 micron particulate.

Dirty air coming into the bubble tank with grates had 273 ppm of 10 micron particulate.

Clean air expelling from the bubble tank with grates had 10 ppm of 2.5 micron particulate.

Clean air expelling from the bubble tank with grates had 115 ppm of 12 micron particulate.

The National Ambient Air quality standards for clean air according to 40 CFR part 50 final rule date of Oct. 15, 2006 states: for air 2.5 micron particulate should be 12 ppm or less and for air with 10 micron particulate should be 150 ppm.

Example 8 included a 2,000 gallon capacity bubble tank with grates which was 83 inches tall and 90 inches in diameter and 1,600 gallons of tap water were installed.

The depth of water in the bubble tank with grates was 66 inches. When the water in bubble tank with grates was saturated by dirty air the pH factor was −5.5 pH. 4.5 ounces of a potassium hydroxide base was flowed into the water to neutralize the pH factor. After neutralization, the pH factor was from 6.8 pH to 7.2 pH.

The air pump used had a static air pressure measured at 80 inches. The air pump was positioned at an elevated level. For air flow, air flow at the air intake was measured at 251.59 cubic feet per minute. Loss of air flow for the volume in the pipes was 1.49 cubic feet. The air flow at output was 250.11.

A down pipe having an 8 inch inner diameter was used to flow air into the bubble tank with grates. A down pipe was connected to the up pipe and extended into the bubble tank with grates. The down pipe had a diameter of 8 inches. The length of the down pipe was 75 inches.

The volume of air lost in the down pipe was 2,568 cubic inches. The total volume of air in the pipes in cubic feet was 1.49 cubic feet.

Dirty air coming into the bubble tank with grates had 139 ppm of 2.5 micron particulate.

Dirty air coming into the bubble tank with grates had 273 ppm of 10 micron particulate.

Clean air expelling from the bubble tank with grates had 10 ppm of 2.5 micron particulate.

Clean air expelling from the bubble tank with grates had 115 ppm of 10 micron particulate.

The National Ambient Air quality standards for clean air according to 40 CFR part 50 final rule date of Oct. 15, 2006 states: for air 12 micron particulate should be 12 ppm or less and for air with 10 micron particulate should be 150 ppm.

Example 9 included a 3,000 gallon capacity bubble tank with grates which was 93 inches tall and 102 inches in diameter and 2,400 gallons of tap water were installed.

The depth of water in the bubble tank with grates was 73 inches. When the water in the bubble tank with grates was saturated by dirty air the pH factor was −5.5 pH. 6 ounces of a sodium hydroxide base was flowed into the water to neutralize the pH factor. After neutralization, the pH factor was from 6.8 pH to 7.2 pH.

The air pump used had a static air pressure measured at 89 inches. The air pump was positioned at the ground level. For air flow, air flow at the air intake was measured at 281.91 cubic feet per minute. Loss of air flow for the volume in the pipes was 3.33 cubic feet. The air flow at output was 278.58 cubic feet per minute.

An up pipe having an 8 inch inner diameter was used to flow air into the bubble tank with grates. A down pipe was connected to the up pipe and extended into the bubble tank with grates. The down pipe had a diameter of 8 inches. The length of the up pipe was 83 inches. The length of the down pipe was 85 inches.

The volume of air lost in the up pipe was 2,841.92 cubic inches. The volume of air lost in the down pipe was 2,910.40 cubic inches. The total volume of air lost in the pipes was 5,752.32 cubic inches. The total volume of air in the pipes in cubic feet was 3.33 cubic feet.

Dirty air coming into the bubble tank with grates had 139 ppm of 2.5 micron particulate.

Dirty air coming into the bubble tank with grates had 273 ppm of 10 micron particulate.

Clean air expelling from the bubble tank with grates had 9 ppm of 2.5 micron particulate.

Clean air expelling from the bubble tank with grates had 110 ppm of 12 micron particulate.

The National Ambient Air quality standards for clean air according to 40 CFR part 50 final rule date of Oct. 15, 2006 states: for air 2.5 micron particulate should be 12 ppm or less and for air with 10 micron particulate should be 150 ppm.

Example 10 included a 4,000 gallon capacity bubble tank with grates which was 131 inches tall and 102 inches in diameter and 3,200 gallons of tap water were installed.

The depth of water in the bubble tank with grates was 105 inches. When the water in the bubble tank with grates was saturated by dirty air the pH factor was −5.5 pH. 7.5 ounces of a potassium hydroxide base was flowed into the water to neutralize the pH factor. After neutralization, the pH factor was from 6.8 pH to 7.2 pH.

The air pump used had a static air pressure measured at 126 inches. The air pump was positioned at an elevated level. For air flow, air flow at the air intake as measured at 397.09 cubic feet per minute. Loss of air flow for the volume in the pipes was 5.48 cubic feet. The air flow at output was 391.61 cubic feet per minute.

A down pipe having a 12 inch inner diameter was used to flow air into the bubble tank with grates. A down pipe was connected to the up pipe and extended into the bubble tank with grates. The down pipe had a diameter of 12 inches. The length of the down pipe was 123 inches.

The volume of air lost in the down pipe was 9,475.92 cubic inches. The total volume of air in the pipes in cubic feet was 5.48 cubic feet.

Dirty air coming into the bubble tank with grates had 139 ppm of 2.5 micron particulate.

Dirty air coming into the bubble tank with grates had 273 ppm of 10 micron particulate.

Clean air expelling from the bubble tank with grates had 9 ppm of 2.5 micron particulate.

Clean air expelling from the bubble tank with grates had 105 ppm of 10 micron particulate.

The National Ambient Air quality standards for clean air according to 40 CFR part 50 final rule date of Oct. 15, 2006 states: for air 12 micron particulate should be 12 ppm or less and for air with 10 micron particulate should be 150 ppm.

Example 11 included in a 5,000 gallon capacity bubble tank with grates which was 157 inches tall and 102 inches in diameter and 4,000 gallons of tap water were installed.

The depth of water in the bubble tank with grates was 126 inches. When the water in the bubble tank with grates was saturated by dirty air the pH factor was −5.5 pH. 7.5 ounces of a sodium hydroxide base was flowed into the water to neutralize the pH factor. After neutralization, the pH factor was from 6.8 pH to 7.2 pH.

The air pump used had a static air pressure measured at 151 inches. The air pump was positioned at the ground level. For air flow, air flow at the air intake was measured at 475.9 cubic feet per minute. Loss of air flow for the volume in the pipes was 13.2 cubic feet. The air flow at output was 462.71 cubic feet per minute.

An up pipe having a 12 inch inner diameter was used to flow air into the bubble tank with grates. A down pipe was connected to the up pipe and extended into the bubble tank with grates. The down pipe had a diameter of 12 inches. The length of the up pipe was 147 inches. The length of the down pipe was 149 inches.

The volume of air lost in the up pipe was 12,324.88 cubic inches. The volume of air lost in the down pipe was 11,478.96 cubic inches. The total volume of air lost in the pipes was 22,803.84 cubic inches. The total volume of air in the pipes in cubic feet was 13.2 cubic feet.

Dirty air coming into the bubble tank with grates had 139 ppm of 2.5 micron particulate.

Dirty air coming into the bubble tank with grates had 273 ppm of 10 micron particulate.

Clean air expelling from the bubble tank with grates had 9 ppm of 2.5 micron particulate.

Clean air expelling from the bubble tank with grates had 97 ppm of 12 micron particulate.

The National Ambient Air quality standards for clean air according to 40 CFR part 50 final rule date of Oct. 15, 2006 states: for air 2.5 micron particulate should be 12 ppm or less and for air with 10 micron particulate should be 150 ppm.

Example 12 included a 6,000 gallon capacity bubble tank with grates which was 182 inches tall and 102 inches in diameter and 4,800 gallons of tap water were installed.

The depth of water in the bubble tank with grates was 146 inches. When the water in the bubble tank with grates was saturated by dirty air the pH factor was −5.5 pH. 9 ounces of a potassium hydroxide base was flowed into the water to neutralize the pH factor. After neutralization, the pH factor was from 6.8 pH to 7.2 pH.

The air pump used had a static air pressure measured at 175 inches. The air pump was positioned at an elevated level. For air flow, air flow at the air intake as measured at 551.69 cubic feet per minute. Loss of air flow for the volume in the pipes was 7.76 cubic feet. The air flow at output was 543.93 cubic feet per minute.

A down pipe having a 12 inch inner diameter was used to flow air into the bubble tank with grates. A down pipe was connected to the up pipe and extended into the bubble tank with grates. The down pipe had a diameter of 12 inches. The length of the down pipe was 174 inches.

The volume of air lost in the down pipe was 13,404.96 cubic inches. The total volume of air in the pipes in cubic feet was 7.76 cubic feet.

Dirty air coming into the bubble tank with grates had 139 ppm of 2.5 micron particulate.

Dirty air coming into the bubble tank with grates had 273 ppm of 10 micron particulate.

Clean air expelling from the bubble tank with grates had 9 ppm of 2.5 micron particulate.

Clean air expelling from the bubble tank with grates had 90 ppm of 10 micron particulate.

The National Ambient Air quality standards for clean air according to 40 CFR part 50 final rule date of Oct. 15, 2006 states: for air 12 micron particulate should be 12 ppm or less and for air with 10 micron particulate should be 150 ppm.

While these embodiments have been described with emphasis on the embodiments, it should be understood that within the scope of the appended claims, the embodiments might be practiced other than as specifically described herein.

What is claimed is:

1. A system for simultaneously removing from dirty air, particulate matter and removing at least one of: carbon dioxide, carbon monoxide, sulfur dioxide, nitric oxide and nitrous oxide, producing cleaned air without the need for heating and cooling of the dirty air, the system comprising:
   a. a bubble tank with grates for receiving the dirty air, the dirty air at 1 bar or less, the bubble tank with grates comprising:
      (i) a dirty air inlet;
      (ii) a clean water inlet;
      (iii) a cleaned air outlet; and
      (iv) a dirty water outlet; and
      wherein the bubble tank with grates further comprises from a bottom of the bubble tank with grates to a top of the bubble tank with grates, sequentially:
      (v) a first grate having first holes, the first holes configured to break up bubbles of the dirty air;
      (vi) a second grate separated from the first grate, the second grate having second holes, the second holes configured to break up bubbles of the dirty air that have passed through the first holes of the first grate;
      (vii) a high efficiency particulate air filter separated from the second grate, the high efficiency particulate air filter configured to receive the bubbles of the dirty air from the second grate and remove a substantial amount of the particulate matter from the bubbles of the dirty air; and
      (viii) an activated carbon filter separated from the high efficiency particulate air filter opposite the first grate with first holes and the second grate with second holes, the activated carbon filter configured to receive the dirty air with reduced particulate content and remove odor from the dirty air with the reduced particulate content, forming cleaned air, and the bubble tank with grates is configured to cause at least one of the following chemical reactions:
      1) formation of carbonic acid by combining carbon dioxide in the dirty air with water in the bubble tank with grates;
      2) formation of sulfuric acid by combining sulfur dioxide in the dirty air with water in the bubble tank with grates;
      3) formation of carbolic acid by combining carbon monoxide in the dirty air with water in the bubble tank with grates; and
      4) formation of nitric acid by combining nitrogen oxides in the dirty air with water in the bubble tank with grates;
   b. an air pump supplying the dirty air to the bubble tank with grates;
   c. a first air quality monitor configured to measure contaminates in parts per million (ppm) in the dirty air prior to the dirty air entering the bubble tank with grates;
   d. a second air quality monitor configured to measure contaminates in parts per million (ppm) in the cleaned air as the cleaned air exits the bubble tank with grates;
   e. a first pH tester configured to identify a first pH of liquid in the bubble tank with grates;
   f. first chemical bins fluidly connected to the bubble tank with grates, the first chemical bins containing a plurality of first bases for flowing into the bubble tank with grates;
   g. a processor connected to a data storage connected to a network, the processor in communication with the first air quality monitor, the second air quality monitor, the first chemical bins, and the first pH tester, wherein the data storage configured to include:
      (i) a library of preset pH limits for the dirty water;
      (ii) a library of bases;
      (iii) a table of ratios of bases versus pH;
      (iv) computer instructions for comparing a measured pH of the dirty water in the bubble tank with grates to preset limits in the library of preset pH limits for the dirty water, and then using the library of bases with the table of ratios of bases versus pH to determine an amount of base and type of base to be added to the dirty water to adjust pH of the dirty water in the bubble tank with grates prior to removing dirty water from the bubble tank with grates; and
      (v) computer instructions for sending a command from the processor to the first chemical bins to dispense an amount and type of base to be added to the dirty water in the bubble tank with grates; and
   h. a power supply connected to the air pump, the first air quality monitor, the second air quality monitor, the first pH tester, and the processor.

2. The system of claim 1, comprising a dirty water pump fluidly connected to the dirty water outlet of the bubble tank with grates and electrically connected to the power supply, the dirty water pump for flowing the dirty water to a centrifuge, wherein the centrifuge is configured to remove the particulate matter from the dirty water and produce centrifuged water, and further wherein the centrifuge is connected to the network.

3. The system of claim 2, further comprising a centrifuge water pump connected between the centrifuge and a pH neutralization container to flow the centrifuged water from the centrifuge to the pH neutralization container, wherein the centrifuge water pump is electrically connected to the power supply and the network.

4. The system of claim 3, comprising a second pH tester in electrical connection with the power supply and in fluid communication with liquid in the pH neutralization container, the second pH tester additionally in electronic communication with the processor, the second pH tester provides a pH to the processor, the processor then communicates with second chemical bins to dispense an amount and type of second bases into the pH neutralization container to create chemical reactions with the liquid in the pH neutralization container prior to removing the liquid as the cleaned water.

5. The system of claim 1, comprising a clean water pump fluidly connected to the clean water inlet, the clean water pump configured to pump the clean water into the bubble tank with grates, the clean water pump electrically connected to the power supply and additionally in electronic communication with the processor.

6. The system of claim 1, wherein the bubble tank with grates further comprises a third grate with third holes positioned between the second grate and the high efficiency particulate air filter.

7. The system of claim 4, comprising a plurality of client devices in communication with the network for receiving and displaying information from the first pH tester, the second pH tester, the first air quality monitor, the second air quality monitor, and the processor.

8. The system of claim 5, comprising a conduit for flowing a portion of the cleaned water from the pH neutralization container to the clean water pump.

9. The system of claim 2, comprising a sludge tank fluidly connected to the centrifuge for receiving the particulate matter from the bubble tank with grates.

10. The system of claim 2, comprising in the data storage:
   a. a library of preset pH limits for the centrifuged water;
   b. computer instructions for comparing the measured pH of the centrifuged water to preset limits in the library of preset pH limits for the centrifuged water, and then using the library of bases with the table of ratios of bases versus pH to determine an amount of chemical and type of base to be added to the centrifuged water, adjusting pH of the centrifuged water prior to removing clean water from a pH neutralization container; and
   c. computer instructions for sending a command from the processor to second chemical bins to dispense the amount and type of base to be added to the pH neutralization container.

* * * * *